Jan. 16, 1951 F. W. REILLY 2,538,042
ENCLOSED SWITCHGEAR
Filed April 30, 1945 2 Sheets-Sheet 1

INVENTOR.
Frank W. Reilly
BY
Austin, Wilhelm & Carlson
ATTORNEYS

Jan. 16, 1951  F. W. REILLY  2,538,042
ENCLOSED SWITCHGEAR
Filed April 30, 1945  2 Sheets-Sheet 2
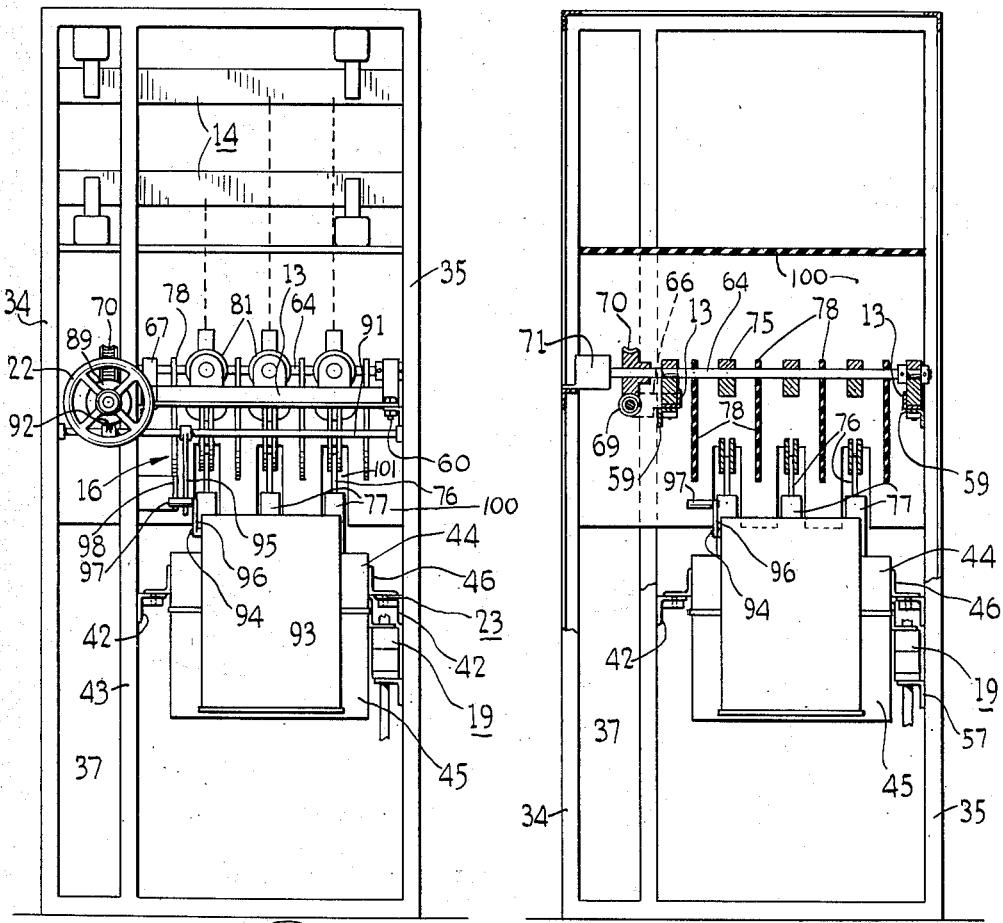
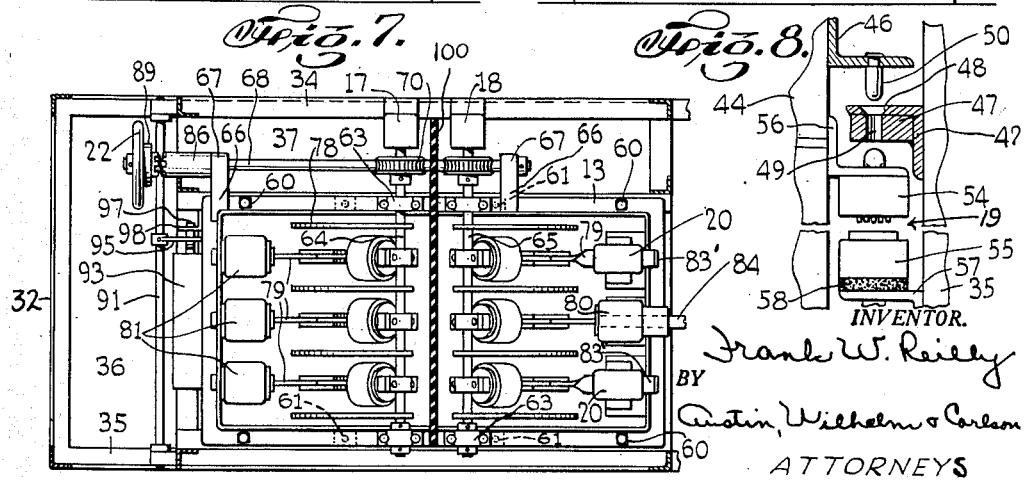
INVENTOR.
Frank W. Reilly
BY
Austin, Wilhelm & Carlson
ATTORNEYS Patented Jan. 16, 1951

2,538,042

UNITED STATES PATENT OFFICE 2,538,042

ENCLOSED SWITCHGEAR

Frank W. Reilly, Auburndale, Mass.

Application April 30, 1945, Serial No. 591,121

5 Claims. (Cl. 175—298)

The invention relates to electric switching and more particularly to enclosed switchgear of the type comprising a circuit breaker and disconnect switch housed in a cubicle.

A general object of the invention is to provide a switchgear of the above type which is less expensive and more reliable than those heretofore proposed.

More specifically, the invention provides for a sub-assembly of a box frame on which the disconnect switch shafts carrying the movable contacts are journaled, and on which one set of stationary contacts are mounted; the invention also provides special dowel devices for properly registering the removable circuit breaker and the sub-assembly box frame in the cubicle; the invention also provides for secondary switch connectors so mounted that, as the self-registering dowels seat the circuit breaker in the cubicle, the secondary switch connectors are also engaged; the invention also provides auxiliary switches directly mounted on the disconnect switch shafts for electrically operating safety devices which it is imperative should always accurately indicate the position of the disconnect switch; the invention also provides special mechanical interlocks between the disconnect switch and the circuit breaker whereby it is impossible to either open or close the disconnect switch with the circuit breaker closed; the invention also provides for an electrical interlock between the auxiliary switches on the disconnect switch shafts and the circuit breaker whereby initial opening movement of the disconnect switch trips the breaker electrically; the invention also provides for the use of current transformer terminals as stationary contacts engaged and disengaged by the disconnect switch; the invention also provides for automatically tripping the circuit breaker as it is replaced in the cubicle or taken out.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which:

Fig. 5 is a front elevation of the cubicle;

Fig. 6 is a section on the line 6—6 of Fig. 1;

Fig. 7 is a horizontal section taken on the line 7—7 of Fig 1; and

Fig. 8 is a detail illustrating the manner in which the secondary connectors engage.

Figure 1:
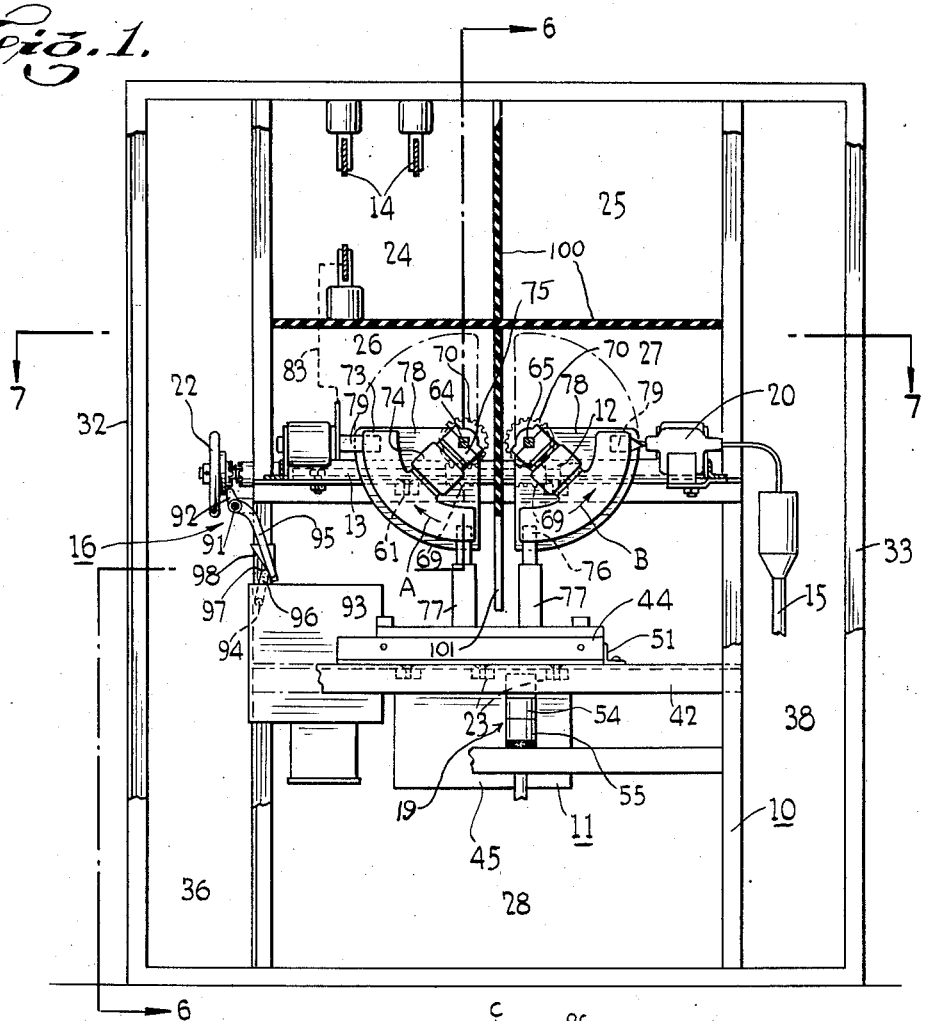
Fig. 1 illustrates partly diagrammatically a vertical section taken through a cubicle according to the invention, the left side of the figure being the front of the cubicle.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, the switchgear comprises in general a cubicle 10 having a removable circuit breaker 11, a disconnect switch 12 mounted upon a sub-assembly frame 13 and operated by hand wheel 22. The cubicle contains bus bars 14 which run along the length of the switchboard through several cubicles as will be understood by those skilled in the art. The branch line which may be a feeder or an incoming line leads to a pothead 15 extending down to the floor of the building. The mechanical interlock between disconnect switch and circuit breaker is denoted by 16 and the auxiliary switches on the disconnect switch shafts are denoted by 17 and 18. The secondary connectors are denoted by 19 and the current transformers by 20. The self-registering dowels are indicated by 23 and 61, the former for the removable circuit breaker and the latter for the sub-assembly frame 13.

Suitable insulating partitions divide the cubicle into bus bar compartment 24, compartment 25 for potential transformers and other apparatus not shown, compartment 26 for one side of the disconnect switch, and compartment 27 for the other side of the disconnect switch.

Cubicle 10 is of more or less conventional construction comprising a steel framework suitably welded together with steel paneling on sides, top and bottom. The cubicle comprises a removable front wall 32 which may be in the form of a door hinged to the side 34; a removable back wall 33 and side walls 34 and 35. Suitable inner frame members may be provided for forming a front instrument space 36, a side space or wire gutter 37 and a back space or wire gutter 38.

The circuit breaker 11 is mounted upon cubicle side rails 42 secured to the partition 43 and to the side wall 35. The circuit breaker 11 is of generally standard construction comprising a frame 44 from which is detachably suspended the oil tank 45. The frame 44 has rails 46 which rest upon the cubicle rails 42. The circuit breaker also comprises a control case 93 which includes the solenoid and other apparatus for operating the circuit breaker.

For convenience in properly replacing the circuit breaker after removal from the cubicle, the registering dowels 23 are provided, three being shown on a side. These dowels must properly register the circuit breaker in the cubicle and also hold it rigidly under the large forces and shocks caused by short circuits and the normal opening of the circuit breaker.

Figure 4:
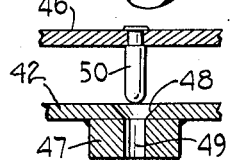
Fig. 4 is a detail illustrating the self-registering dowel.

The registering dowels comprise (Fig. 4) flaring holes 48 in the rails 42 merging with comparatively deep cylindrical holes 49 secured to special blocks or pads 47 welded or otherwise secured to the underside of the rail 42. The circuit breaker frame 44 has side rails or rests 46 which have secured thereto comparatively long dowel pins 50 having rounded noses which cooperate with the flaring surfaces 48 to center and accurately seat the dowel pins 50 in the dowel holes 49. Suitable stops 51 may be placed on the cubicle rails 42 against which the circuit breaker engages when it is moved into the cubicle, to approximately position the circuit breaker with respect to the dowels.

The secondary connector 19 comprises a top case 54 (Fig. 8) secured to a special strap 56 secured to the circuit breaker frame 44. Secondary connector 19 also includes a bottom case 55 mounted upon a spring rubber pad 58 secured to angle 57 attached to adjacent cubicle wall 35. It will be understood that the bottom case 55 will normally be alive with 125 volt D. C. current even when the connectors 54, 55 are disengaged. Therefore the bottom case 55 contains a plurality of sockets and the top case 54 contains a plurality of plugs for engaging the sockets, which will be understood by those skilled in the art. This connector ordinarily takes care of five or more conductors which are required for electrically closing the circuit breaker, electrically opening it, and operating the usual red signal light which shows the circuit breaker to be closed and the usual green signal light which shows the circuit breaker to be open.

Briefly, the dowels and secondary connectors 54, 55 operate as follows: To remove the circuit breaker 11 from the cubicle after the disconnect is opened, a truck (not shown) is wheeled into the cubicle. The truck first elevates the circuit breaker an inch or two to the position shown in Fig. 8. This disengages the dowels 23 and also the secondary connectors 19 so that the truck may withdraw the circuit breaker 11 horizontally out of the front of the cubicle. After the circuit breaker is tested or repaired, it is replaced in the reverse manner, the circuit breaker being wheeled back into the cubicle at an upper elevation until it engages the stops 51 whence the truck is lowered to center the dowel pins 50 in the dowel holes 49 at which time the secondary connectors 54 and 55 are also registered and brought into engagement.

The disconnect switch 12 comprises the box frame 13 (Fig. 7) which may be a rectangular frame formed of four side members suitably welded or otherwise secured together and open at top and bottom. This frame 13 rests upon horizontal cubicle frame members 59 (Fig. 6) and is bolted thereto by a series of bolts 60. Self-centering dowels 61, similar to 23, may be provided to place the frame in proper position in the cubicle, but if desired, only two self-centering dowels 61 on a side may be provided, these dowels being vertically in line with the corresponding end circuit breaker dowels 23.

The prime reason for the separate box frame 13 is not to make the disconnect switch easily removable from the cubicle, although this advantage is not precluded, but is mainly for the purpose of being able to properly align and assemble the various apparatus supported on the frame or a work station prior to assembly in the cubicle, so that, when the parts are reassembled in the cubicle, everything will be in register as will be more apparent from explanation given hereinafter.

The box frame 13 supports bearings 63 for the disconnect switch shafts 64 and 65. The frame has cantilever end and center brackets 66 to support bearings 67 for the operating shaft 68 on which the hand wheel 22 is mounted. The several bearings 63 and 67 may be of any desired construction.

The operating or drive shaft 68 has worms 69 engaging worm wheels 70 on the two switch shafts 64 and 65. The two switch shafts support auxiliary switches 17 and 18 directly mounted upon these shafts, the switch casings being mounted upon an adjacent cubicle wall 34. It will thus be seen that the auxiliary switches 17 and 18, being mounted directly upon the disconnect switch shafts, are absolutely constrained to indicate the true positions of said shafts at all times, a safety precaution which will be explained more in detail hereinafter.

The disconnect switch shafts 64 and 65 support a plurality of sector jaw blades 73, six being shown for both incoming and outgoing lines of a three phase alternating current system. Each jaw blade 73 is mounted upon its particular post insulator 74 which in turn is mounted upon a fitting 75 which is tightly clamped to the particular disconnect switch shaft 64 or 65. These shafts may be of square cross section, except at the bearings, to insure absolutely rigid cantilever relationship between the shafts and the sector jaw blades 73. The sector jaw blades 73 engage sets of tongues 76 on the circuit breaker terminals 77 and tongues 79 constituting frame contacts, such frame contacts 79 being mounted on the current transformers 20, on insulating bushing 80 and on post insulators 81, all of which are mounted on the box frame 13, as shown in Fig. 7.

It will be noted that the frame contacts 79 which are supported by post insulators 81 have leads 83 which connect with the bus bars 14 and that the current transformers 20 have leads 83' and the bushing insulator 80 has lead 84 which connect with and form part of the cable entering pothead 15, as will be understood by those skilled in the art.

The disconnect switch shafts 64 and 65 also support barriers 78 of insulating material rigidly secured to these shafts to rotate therewith. These barriers 78 are sector or pie-shape and extend beyond the outer circumference of sector jaw blades 73 and beyond the radial ends thereof to prevent flashover. It will be noted that these barriers 78 are located between the several phases and also between the end phases and ground, there being four barriers to each shaft. Both barriers 78 and switch arms are adjustable lengthwise of the switch shafts during assembly.

Both sector barriers 78 and the partitions 100 forming the several compartments 24—27 are made of suitable insulating material such as asbestos ebony. The partitions 100 are secured in position by suitable structural members (not shown) secured to the cubicle frame. The vertical partition 100 has suitable vertical slots 101 to clear the circuit breaker contacts 76 and bushings 77 for removal of the circuit breaker.

The operation of the disconnect switch will be described to make the reason for the sub-assembly box frame 13 more apparent. As will be explained hereinafter, the turning of hand wheel 22 turns drive shaft 68, which in turn rotates disconnect switch shafts 64 and 65 in opposite directions. The disconnect switch is shown closed in Fig. 1. When the hand wheel 22 is turned, the switch shafts 64 and 65 rotate in the direction of the arrows A and B approximately ninety degrees so as to completely disengage the circuit breaker tongues 76. This both opens the circuit and mechanically frees the circuit breaker for removal from the cubicle if desired. Both sector blades and sector barriers are then in upper position in the compartments 26 and 27. To close the disconnect switch, the operation is reversed, the hand wheel 22 being turned to lower the sector blades 73 to engage the circuit breaker tongues 76.

It will be apparent that it is very desirable to have the disconnect switch blades 73 and the upper and lower stationary terminals 79 and 76 in register to obtain proper operation of the disconnect switch. The lining up of the dowel holes of frame dowels 61 with the dowel holes of circuit breaker dowels 23 insures correct relationship between the sub-assembly frame 13 and the circuit breaker 11. The mounting of the several post insulators 81, bushing 80 and current transformers 20 on the sub-assembly frame 13 and the mounting of the several shafts on the frame 13 and the mounting of the several sector blades 73 is all done with relation to the dowels 61 whose relation to the circuit breaker contacts is predetermined by the relationship of dowels 23 and 61 above mentioned.

This sub-assembly work is conveniently done at a work station away from the cubicle. When these parts are once all properly located and fitted with respect to the box frame 13, it is comparatively easy to relocate them on the box frame if it be necessary to disassemble some of these parts from the box frame for the purpose of inserting the box frame into the cubicle.

It is desirable to have safety interlocks to prevent either opening or closing of the disconnect switch 12 while the circuit breaker 11 is closed. The present invention provides for both mechanical and electric interlocks which may be used either separately or together in the same cubicle.

The mechanical interlock 16 is as follows: The hand wheel 22 is mounted to rotate freely on control shaft 68. Wheel 22 has dog teeth 87 which cooperate with dog teeth 86 fixedly mounted on control shaft 68. These dog teeth are normally held apart by a stiff spring 88, requiring that the hand wheel be pushed inwardly in the direction of arrow C with positive pressure to engage dog teeth 86, 87 for the purpose of rotating control shaft 68.

The hand wheel 22 also carries an annular collar 89 adapted to engage a lever 92 mounted on shaft 91 extending across the front of the cubicle. The shaft 91 also carries a lever 95 adapted to engage behind roller 97 mounted on circuit breaker trip lever 96. Lever 96 is mounted upon a pivot shaft 94 located in the control case 93 of the circuit breaker 11. The pivot shaft 94 is the shaft which is ordinarily used to mechanically trip the breaker to open it.

It will thus be seen that, as the hand wheel 22 is pushed in to engage the dog teeth 86, 87 against spring 88, the interlock lever 95 will engage trip lever 96 to mechanically trip the circuit breaker 11. At the same time the trip lever 96, being mounted outside of the interlock lever 95, does not interfere with the raising of the circuit breaker or its outward movement for withdrawing the circuit breaker from the cubicle.

The cubicle frame also carries a wedge or cam member 98 against which the roller 97 engages as the breaker 11 is moved inwardly to replace it in the cubicle to trip the breaker. As the breaker 11 is lowered to engage the dowels, the roller rides down the cam surface 98 to a position permitting the circuit breaker to be closed, if desired. When the circuit breaker is raised in the removing operation, the cam 98 acts to trip the breaker if not already tripped by the interlocks also provided.

The auxiliary switches 17 and 18 mounted upon the disconnect switch shafts 64 and 65 may be disposed in circuits which give visual or audible signal showing the position of the disconnect switch and also may be used for electrically tripping the circuit breaker upon initial movement of the disconnect switch shaft either to open or to close the disconnect switch.

Figure 2:
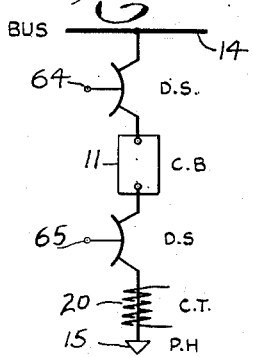
Fig. 2 is a single line diagram representing the circuit of this cubicle.
Figure 3:
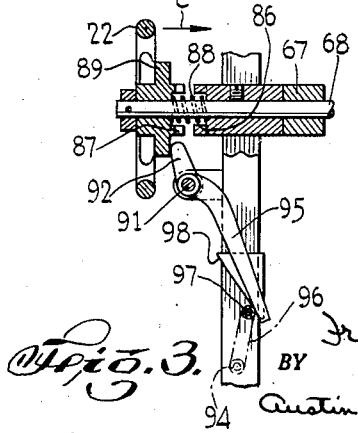
Fig. 3 is a detail illustrating the mechanical interlock between disconnect switch and circuit breaker and between circuit breaker and cubicle frame.

This cubicle construction, as will be readily apparent to those skilled in the art, is sometimes referred to as a single bus system. Its circuit is illustrated by the single line diagram of Fig. 2 wherein the same main reference characters are used as on the structural figures. D. S. indicates disconnect switch; C. B. indicates circuit breaker; C. T. indicates current transformer; P. H. indicates pothead.

Thus it will be seen that the above switchgear is inexpensive to manufacture and reliable in operation. The cantilever disconnect switch arms operated by the two metal disconnect switch shafts provide positive and direct disconnect movement. The sector-shaped barriers provide protection against flashover between the individual phases and between the phases and ground. The insulating barriers forming the compartments provide similar protection between the incoming and outgoing sides of the disconnect switch, the bus chamber and the other chamber 25.

The special sub-assembly frame provides economy in manufacture and facilitates removal of the disconnect switch for maintenance, repair and adjustment. The self-centering dowel construction facilitates removal and replacement of the circuit breaker and yet holds the circuit breaker rigid when once in place. The secondary connectors are so mounted as to be automatically engageable when the circuit breaker is seated and automatically disengageable when the circuit breaker is raised for removal.

The mechanical interlock between disconnect switch hand wheel and circuit breaker increases safety, tripping the circuit breaker whenever the disconnect switch is moved to open it or to close it. As an additional precaution, the circuit breaker is tripped by the special cam block when it is raised for removal and when it is wheeled into the cubicle for replacement.

The auxiliary switches on the disconnect switch shafts provide a positive indication, as by colored lights or by audible signal, of the position of the disconnect switch. The auxiliary switches also provide electric interlock to trip the circuit breaker upon initial movement of the disconnect switch shafts either for opening or closing. The auxiliary switch arrangement may be such that failure of either disconnect switch shaft to move will be indicated.

While certain novel features of the invention have been disclosed herein, and are pointed out in the annexed claims, it will be understood that various omissions, substitutions and changes may be made by those skilled in the art without departing from the spirit of the invention.

What is claimed is:

1. In enclosed electric switching apparatus, a cubicle, a removable circuit breaker in said cubicle, having side rails, the frame of said circuit breaker having supports resting on said rails, vertical register devices between said supports and said rails, said circuit breaker having a trip lever, a disconnect switch for disconnecting said circuit breaker, a shaft for operating said disconnect switch, a hand member loosely mounted on said shaft, teeth attached to said hand member, a sleeve having teeth affixed to said operating shaft, a pivot device secured to said cubicle, a lever attached to said pivot device and engageable by said hand member, a second lever secured to said pivot device and located behind said trip lever whereby said trip lever is actuated when said hand member is pressed axially to operate the disconnect switch.

2. In enclosed electric switching apparatus, a cubicle, a removable circuit breaker in said cubicle, said cubicle having side mountings, the frame of said circuit breaker having supports resting on said mountings, vertical register devices between said supports and said mountings, said circuit breaker having a trip member, a disconnect switch for disconnecting said circuit breaker, a cam device on said cubicle frame located behind said trip member whereby said trip member will be actuated when said circuit breaker is raised to disengage said vertical register devices prior to withdrawal of the breaker and when said circuit breaker is moved into the cubicle.

3. In enclosed electric switching apparatus, a cubicle, a multi-phase circuit breaker unit mounted in said cubicle so as to be horizontally removable therefrom, said circuit breaker unit having incoming and outgoing disconnect switch contacts, a sub-assembly frame mounted in said cubicle, incoming and outgoing disconnect switch terminals mounted on said sub-assembly frame, movable switch contacts having conducting relation with said frame terminals and adapted to engage and disengage said circuit breaker contacts, an incoming switch shaft and an outgoing switch shaft both journaled on said sub-assembly frame, cantilever insulated switch arms rigidly attached to their respective shafts and to their respective movable contacts, vertical register devices on said cubicle and circuit breaker unit for positioning said circuit breaker in proper position in said cubicle in a horizontal direction, vertical register devices on said cubicle and on said sub-assembly frame for positioning the latter in proper position in a horizontal direction with respect to said circuit breaker unit, whereby to place said movable switch contacts in alignment with said circuit breaker contacts, said sub-assembly frame being open to permit said movable switch contacts to pass therethrough.

4. In enclosed electric switching apparatus, a cubicle, a multi-phase circuit breaker unit mounted in said cubicle so as to be horizontally removable therefrom, said circuit breaker unit having incoming and outgoing disconnect switch contacts, a sub-assembly frame mounted in said cubicle, incoming and outgoing disconnect switch contacts mounted on said sub-assembly frame, movable bridging switch contacts adapted to span said frame contacts and said circuit breaker contacts, an incoming switch shaft and an outgoing switch shaft both journaled on said sub-assembly frame, post insulators rigidly attached to their respective shafts and to their respective movable bridging contacts, a drive shaft journaled on said sub-assembly frame, connections between said drive shaft and said switch shafts for moving said movable contacts by operation of said drive shaft, vertical register devices on said cubicle and circuit breaker unit for positioning said circuit breaker in proper position in said cubicle in a horizontal direction, vertical register devices on said cubicle and on said sub-assembly frame for positioning the latter in proper position in a horizontal direction with respect to said circuit breaker unit, whereby to place said bridging switch contacts in alignment with said circuit breaker contacts, said sub-assembly frame being open to permit said movable switch contacts to pass therethrough.

5. In enclosed electric switching apparatus, a cubicle, a removable circuit breaker unit mounted in said cubicle so as to be horizontally removable therefrom, said cubicle having side mountings, the frame of said circuit breaker unit having supports resting on said mountings, vertical register devices between said supports and said mountings, said register devices being so positioned that said circuit breaker must be raised to disengage said register devices prior to horizontal withdrawal from the cubicle, said circuit breaker having a trip member, a disconnect switch for disconnecting said circuit breaker, interlock means between said disconnect switch and said circuit breaker whereby said trip member is actuated when said disconnect switch is operated, interlock means between the cubicle and circuit breaker whereby said trip member is actuated when said circuit breaker is raised to disengage said vertical register devices prior to withdrawal of the breaker and whereby said trip member is also operated when said circuit breaker is moved back into the cubicle.

FRANK W. REILLY.

REFERENCES CITED

The following references are of record in the file of this patent:

UNITED STATES PATENTS

| Number | Name | Date |
|---|---|---|
| 934,097 | Sessions | Sept. 14, 1909 |
| 1,505,633 | Finney | Aug. 19, 1924 |
| 1,522,169 | Young | Jan. 6, 1925 |
| 1,531,917 | French | Mar. 31, 1925 |
| 1,584,623 | McCoy | May 11, 1926 |
| 1,658,913 | Ansingh | Feb. 14, 1928 |
| 1,929,983 | MacNeil | Oct. 10, 1933 |
| 1,968,619 | Reed | July 31, 1934 |
| 2,080,226 | Paxton | May 11, 1937 |
| 2,106,061 | Paxton | Jan. 18, 1938 |
| 2,129,723 | Wood | Sept. 13, 1938 |
| 2,281,739 | Wright | May 5, 1942 |
| 2,346,460 | Sillers | Apr. 11, 1944 |
| 2,374,702 | Reilly | May 1, 1945 |
| 2,374,703 | Reilly | May 1, 1945 |
| 2,438,371 | Morholz | Mar. 23, 1948 |

FOREIGN PATENTS

| Number | Country | Date |
|---|---|---|
| 354,039 | Great Britain | Aug. 6, 1931 |